(12) United States Patent
Gerardin et al.

(10) Patent No.: US 6,500,871 B1
(45) Date of Patent: Dec. 31, 2002

(54) PROCESS FOR PREPARING COLLOIDS OF PARTICLES COMING FROM THE HYDROLYSIS OF A SALT OF A METAL CATION

(75) Inventors: Corine Gerardin, Princeton, NJ (US); Olivier Anthony, Highland Park, NJ (US); Jean-Yves Chane-Ching, Eaubonne (FR); Mathias Destarac, Paris (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 14 days.

(21) Appl. No.: 09/590,118

(22) Filed: Jun. 8, 2000

(51) Int. Cl.$^7$ .............................. B01F 3/12; B01F 17/52

(52) U.S. Cl. .............................. 516/89; 516/93; 516/97; 516/78; 106/287.17; 106/287.18; 501/12

(58) Field of Search .............................. 516/78, 89, 93, 516/97; 525/941; 106/287.17, 287.18; 501/12

(56) References Cited

U.S. PATENT DOCUMENTS

| 6,054,111 A | * | 4/2000 | Antonietti et al. | 423/702 |
| 6,087,452 A | * | 7/2000 | Sewart et al. | 525/323 |
| 6,169,119 B1 | * | 1/2001 | Ryang et al. | 516/93 |

FOREIGN PATENT DOCUMENTS

| WO | WO 96/26004 | * | 8/1996 |

* cited by examiner

*Primary Examiner*—Daniel S. Metzmaier

(57) ABSTRACT

Process for preparing mineral particles in the form of colloids in aqueous dispersion of controlled size from a precursor, comprising: a) the step of putting the said precursor, which is a mineral salt of a metal cation, into aqueous solution; b) the complexation of the product obtained in a) with at least one water-soluble block copolymer having at least one complexing anionic hydrophilic block and at least one stabilizing nonionic hydrophilic block; and c) the partial or complete hydrolysis of the said precursor in order to obtain controlled growth of the mineral particles in the form of an aqueous dispersion. Use of said colloids, especially as reinforcing fillers for a polymer.

12 Claims, No Drawings

PROCESS FOR PREPARING COLLOIDS OF PARTICLES COMING FROM THE HYDROLYSIS OF A SALT OF A METAL CATION

The subject of the present invention is a process for preparing particles coming from the hydrolysis of a salt of a metal cation.

It is already known to prepare calcium phosphate crystals in the presence of copolymers having two hydrophilic blocks of different nature by alkyl chain anchoring (Antonietti, Mann, *Chem. Eur. J.*, 1998). It is also known to control the growth of calcium carbonate crystals (J. M. Marentette, *Adv. Materials*, 1997; and M. Antonietti, *Langmuir*, 1998; as well as H. Colfen and M. Antoniette, *Langmuir*, 1998, 14, 582–589). It is also known to control the growth of noble metals in the presence of block copolymers having at least one hydrophilic block and at least one hydrophobic block (S. Foster and M. Antonietti, *Adv. Materials*, 1997).

The present invention provides a process for preparing mineral particles in the form of colloids in aqueous dispersion of controlled size from a precursor, comprising:

a) the step of putting the said precursor, which is a mineral salt of a metal cation, into aqueous solution;

b) the complexation of the product obtained in a) with at least one water-soluble block copolymer having at least one complexing anionic hydrophilic block and at least one stabilizing nonionic hydrophilic block; and c) the partial or complete hydrolysis of the said precursor in order to obtain controlled growth of the mineral particles in the form of an aqueous dispersion.

According to a variant, the process of the invention furthermore includes, after step a):

$a_1$) the partial hydrolysis of the product obtained in a).

The mineral precursors are, in general, mineral ions, mineral clusters, ultrafine particles whose particle size is less than 100 nm, or mixtures thereof.

More particularly, the mineral precursors are salts—oxides or hydroxides— of a cation of a metallic element chosen from an element from column 3b (scandium column) to column 5 a (nitrogen column) of the Periodic Table of Elements, including the rare earths and the actinides. More particularly preferred within the context of the present invention are the multivalent metals or ions and more particularly the rare earths, in particular cerium, yttrium, precious metals and platinum-group metals, namely gold, silver, platinum, iridium, ruthenium, rhodium, osmium and palladium, transition metals, more particularly iron, cobalt and nickel, as well as copper, zinc and aluminium.

The optional partial hydrolysis of step $a_1$) and the hydrolysis of step c) are preferably carried out using mineral bases such as alkali or alkaline-earth hydroxides, among which mention may be made of sodium hydroxide, ammonium hydroxide, potassium hydroxide and calcium hydroxide. If, when carrying out the process of the invention, it is necessary to use n moles of base to achieve the desired hydrolysis of the cation of the mineral precursor, it is recommended to use $n_1$ moles of base during the optional step $a_1$) followed by the use of $n_2$ moles of base when carrying out step c), with the relationship $n=n_1+n_2$. The term "desired hydrolysis" according to the present invention should be understood to mean the cumulative final hydrolysis obtained after implementation of optional step $a_1$) followed by implementation of step c). This final hydrolysis may either be partial or complete. Complete hydrolysis is obtained when n is equal to the charge of the metal cation and results in an oxide or hydroxide present in the final mineral particle. If the final hydrolysis is partial, it is possible to obtain in the final mineral particle hydroxide salts such as, for example, $Cu_2(OH)_3Cl$. In many cases, in order to obtain high-quality particles, it is recommended to use an approximately stoichiometric amount of base (n moles) in order to completely convert the anion or the metal contained in the mineral precursor into an oxide or hydroxide. According to a preferred variant, n, $n_1$ and $n_2$ are linked by the relationships:

$0.2n \leq n_1 \leq 0.8n$; and $0.2n \leq n_2 \leq 0.8n$ and $n_1+n_2=1$.

Steps a), $a_1$), b) and c) are generally carried out in an aqueous reaction solution whose temperature is room temperature (about 20° C. ) and at atmospheric pressure, although a lower or higher pressure than this atmospheric pressure can be used. However, it is possible to raise the temperature of the reaction mixture to a temperature of between room temperature and the boiling point of this mixture, which is generally about 100° C. Steps a), $a_1$), b) and c) are carried out in an aqueous reaction solution whose pH is by preference set between 5 and 12, and preferably has a pH at least equal to the pKa of the anionic block of the copolymer.

The process according to the invention may include, immediately after step c), an additional step d) of maturation of the colloid dispersion at a temperature generally of between 50° C. and a temperature of less than or equal to the boiling point of the said dispersion. Optionally, after step c) or d), the process according to the invention may include an additional step of concentrating the dispersion. This additional concentration step may especially be carried out by ultrafiltration, dialysis, drying/redispersion in water, precipitation/redispersion in water or centrifuging/redispersion in water.

More than approximately 80% of the colloid particles obtained at the end of step c) generally have a size of between 2 and 500 nm, preferably between 2 and 200 nm. One way of controlling the size of the colloid particles is to use a greater or lesser amount of moles $n_1$ during step a) This is because the greater $n_1$ and the closer it is to n, the greater the particle size.

The water-soluble block copolymer has at least one complexing anionic hydrophilic block and at least one stabilizing nonionic hydrophilic block. These copolymers have a number-average molecular mass $\overline{M}_n$ of preferably between 2000 and 20,000 and preferably between 3000 and 10,000 g/mol. Preferably, a copolymer having a nonionic hydrophilic block of greater mass than the complexing ionic block is used. The anionic blocks include, for example, polymethacrylic acid and its salts, polyacrylic acid and its salts, copolymers of methacrylic acid and its salts, copolymers of acrylic acid and its salts, heparin, polyphosphates and polyamino acids, such as polyaspartic acid, polyglutaminic acid, polymalic acid and polylactic acid. The preferred anionic blocks within the context of the present invention are blocks having carboxylic groups in the polymer chain. Examples of monomers allowing such blocks to be prepared are acrylic acid, aspartic acid, citraconic acid, p-hydroxycinnamic acid, trans-glutaconic acid, glutamic acid, itaconic acid, linoleic acid, methacrylic acid, maleic acid, oleic acid, maleic anhydride, mesaconic acid, 2-propene-1-sulphonic acid and vinylsulphonic acid.

The nonionic blocks, include, for example, polyether glycols, in other words polyethylene oxide, polypropylene oxide, ethylene oxide-propylene oxide copolymers, polysaccharides, polyacrylamides, polyacrylic esters, polymethacrylamide, polyvinyl alcohol, polyvinyl pyrrolidone, polyorthoesters, polyamino acids and polyglycerols. The preferred nonionic blocks within the context of the present invention are polyhydroxyethyacrylate and polyvinyl alcohol blocks. In order to prepare the block polymers, it is possible, for example, to use the anionic polymerization with sequential addition of 2 monomers as described, for example, by Scmolka, *J. Am. Oil Chem. Soc.* 1977, 54, 110; or else Wilczek-Veraet et al., *Macromolecules* 1996, 29, 4036. Another process that can be used consists in starting the polymerization of a block copolymer at each of the ends of another block polymer as described, for example, by Katayose and Kataoka, *Proc. Intern. Symp. Control. Rel. Bioact. Materials*, 1996, 23, 899.

Within the context of the present invention, it is recommended to use a living or controlled polymerization as defined by Quirk and Lee (*Polymer International* 27, 359 (1992).

This particular process makes it possible, in fact, to prepare polymers of narrow dispersity and the length and composition of the blocks of which are controlled by the stoichiometry and the degree of conversion. Within the context of this type of polymerization, more particularly recommended block co-polymers are those which may be obtained by any so-called living or controlled polymerization process such as, for example:

controlled radical polymerization using xanthates according to the teaching of Application WO 98/58974;

controlled radical polymerization using dithioesters according to the teaching of Application WO 97/01478;

polymerization using nitroxide precursors according to the teaching of Application WO 99/03894;

controlled radical polymerization using dithiocarbonates according to the teaching of Application WO 99/31144;

atom-transfer radical polymerization (ATRP) according to the teaching of Application WO 96/30421;

controlled radical polymerization using iniferters according to the teaching of Otu et al., *Makromol. Chem. Rapid. Commun.*, 3, 127 (1982);

controlled radical polymerization using degenerative transfer of iodine according to the teaching of Tatemoto et al., Jap, 50, 127, 991 (1975), Daikin Kogyo Co Ltd, Japan and Matyjaszewski et al., *Macromolecules*, 28, 2093 (1995);

group transfer polymerization according to the teaching of O. W. Webster, "Group Transfer Polymerization", pp. 580–588 in *Encyclopaedia of Polymer Science and Engineering*, Vol. 7 and H. F. Mark, N. M. Bikales, C. G. Overberger and G. Menges, Edit., Wiley Interscience, New York, 1987;

controlled radical polymerization using tetraphenylethane derivatives (D. Braun et al., *Macromol. Symp.*, 111, 63 (1996)); and controlled radical polymerization using organocobalt complexes (Wayland et al., *J. Am. Chem. Soc.* 116, 7973 (1994)).

Another means for controlling the size of the colloid particles is to vary the amount of complexing copolymer, which is the molar ratio of the complexing group of the complexing anionic hydrophilic block or blocks to the number of moles of the metal cation contained in the mineral precursor and which is converted into oxide or hydroxide. This ratio is generally between 0.05 and 10, more particularly between 0.1 and 1. In general, the higher this ratio, the smaller the size of the colloid particles.

Among the possible applications for the colloidal systems prepared by the process according to the invention, mention may be made of the mechanical polishing of hard objects, such as metal components, the production of pigments, of mixed ceramics for electronics, the reinforcement of polymeric matrices, fungicidal or biocidal dispersions and the scavenging of sulphur derivatives and, more generally, the trapping of unpleasant smells.

The following examples illustrate the invention without limiting the scope thereof.

EXAMPLE 1

Synthesis of a poly(acrylic acid)-b-poly(2-hydroxyethyl acrylate) Diblock Copolymer (PAA-b-PHEA)

1st Part: Synthesis of the PAA First Block 30 g of acrylic acid, 6.24 g of 2-mercaptopropionic acid methyl ester O-ethyl dithiocarbonate (S-propionyl O-ethyl xanthate), 0.245 g of AIBN (azo(bisisobutyronitrile)) and 125 ml acetone are introduced at room temperature into a 250 ml round-bottomed flask fitted with a magnetic stirrer. Next, the flask surmounted by a refrigerant is placed in an oil bath maintained at 70° for 18 hours. Next, the solution is concentrated in a rotary evaporator and the polymer is then precipitated in acetonitrile and dried in a vacuum oven.

GPC (gel permeation chromatography) analysis in water (UV detection at 290 nm) of the polymer obtained confirms the presence of xanthate at the end of the chain, as do $^1$H NMR and MALDI-TOF MS analysis.

Conversion: 88.5%.

$M_n$ (number-average molar mass)=1050 g/mol (determined by $^1$H) NMR).

2nd Part: Synthesis of the PAA-b-PHEA Diblock 5 g of acrylic polyacid from the first step are introduced into a 250 ml glass round-bottomed flask, together with 37 g of water, 74 g of acetone, 4 g of 2-hydroxyethyl acrylate (HEA) and 0.04 g of AIBN. Next, the flask surmounted by a refrigerant is placed in an oil bath maintained at 70° C. Added to the mixture every 15 minutes, for 2 hours 45 minutes, are 4 g of HEA and, after 1 hour and 2 hours of reaction, 0.4 g of AIBN. The reaction is continued for 20 hours. Next, the solution is concentrated in a rotary evaporator and the polymer is then precipitated in ether and dried in a vacuum oven.

Yield: 94.6%.

$M_n$=12,100 g/mol (determined by aqueous GPC, based on polyethylene oxide standards.

EXAMPLE 2

Colloidal Aqueous Dispersion of Copper Hydroxide, Stabilized by a PAA-b-PHEA Block Copolymer with AA/Cu=0.3

3 ml of an $8 \times 10^{-3}$ mol/l $CuCl_2$ solution are poured into a beaker. 150 μl of a 0.2 mol/l aqueous NaOH solution is added with magnetic stirring.

The mixture is left to stand for 10 minutes. The degree of prehydrolysis of the copper is $h_1$=[OH]/[Al]=1.25. While stirring, 200.1 mg of a 2.89% by weight aqueous solution of the PAA-b-PHEA copolymer described in Example 1 are added, the pH of the copolymer solution having been adjusted beforehand to 5.5. The monomer molar ratio AA/Cu is 0.3.

Next 90 μl of NaOH (0.2 mol/l) are added. The solution is made up to 4.5 ml with deionized water. The molar copper concentration is $5.33 \times 10^{-3}$ mol/l. The suspension obtained is blue, cloudy and stable. The pH is 7.2.

The hydrodynamic diameter of the particles measured by dynamic light scattering is 170 nm.

EXAMPLE 3

Colloidal Aqueous Dispersion of Copper Hydroxide Stabilized by a PAA-b-PHAE Block Copolymer, with AA/Cu=1

3 ml of an $8\times10^{-3}$ mol/l $CuCl_2$ solution are poured into a beaker. Added to the solution, with magnetic stirring, are 150 μl of a 0.2 m/l aqueous NaOH solution. The mixture is left to stand for 10 minutes. The degree of copper prehydrolysis is $h_1$=[OH]/[Al]=125. While stirring, 667 mg of a 2.89% by weight aqueous solution of the PAA-b-PHEA copolymer described in Example 1 are added, the pH of the copolymer solution having been adjusted beforehand to 5.5. The monomer molar ratio AA/Cu is 1.

The hydrodynamic diameter of the aggregates in suspension, measured by dynamic light scattering, is 130 nm.

Next, 90 μl of NaOH (0.2 mol/l) are added to this same suspension. Finally, the solution is made up to 4.5 ml with deionized water. The molar copper concentration is $5.33\times10^{-3}$ mol/l.

The suspension obtained is blue, cloudy and stable. The hydrodynamic diameter of the particles measured by dynamic light scattering is 130 nm.

EXAMPLE 4

Aqueous Dispersion of Aggregates Based on Copper and a PAA-b-PHEA Block Copolymer with AA/Cu=0.3.

3 ml of an $8\times10^{-3}$ mol/l $CuCl_2$ solution are poured into a beaker. No prehydrolysis is carried out.

While stirring, 200.1 mg of a 2.89% by weight aqueous solution of the PAA-b-PHEA copolymer described in Example 1 is added, the pH of the copolymer solution having been adjusted beforehand to 5.5. The monomer molar ratio AA/Cu is 0.3. Finally, the solution is made up to 4.5 ml with dionized water. The copper molar concentration is $5.33\times10^{-3}$ mol/l.

The hydrodynamic diameter of the aggregates measured by dynamic light scattering is 35 nm.

EXAMPLE 5

Colloidal Aqueous Dispersion of Aluminium Hydroxide Stabilized by a PAA-b-PHEA Block Copolymer with AA/Al=0.3.

Poured into a round-bottomed flask surmounted by a refrigerant are 15 ml of a 0.3 mol/l aqueous $AlCl_3$ solution. The solution is heated to 90° C. Added to it over 10 minutes, with magnetic stirring, are 22.41 ml of a 0,5 mol/l aqueous NaOH solution. The degree of aluminium prehydrolysis is $h_1$=[OH]/[Al]=2.46.

The solution is left to cool down to room temperature. The aluminium concentration is 0.121 mol/l. This solution is diluted 10 times.

A sample of 7 ml of this prehydrolized aluminium solution is taken. Added to it, with stirring, are 165.1 mg of a 2.3% by weight aqueous solution of the PAA-b-PHEA copolymer described in Example 1, the pH of the copolymer solution having been adjusted beforehand to 5.5. The monomer molar ratio AA/Al is 0.3.

Next, 90 μl of NaOH (0.2 mol/l) are added. The solution is made up to 14 ml with deionized water. The aluminium molar concentration is $6.05\times10^{-3}$ mol/l.

The hydrodynamic diameter of the particles measured by dynamic light scattering is 45 nm.

EXAMPLE 6

Synthesis of a poly(ethylacrylate)-b-poly (vinylacetate) Diblock Copolymer (PEtA-b-PVAc)

The following are introduced at 30° C. into a 4 l jacketed reactor fitted with a paddle stirrer: 1411 g of water, 0.88 g of sodium carbonate and 23.98 g of sodium dodecyl sulphate. While stirring, the reactor is purged using a stream of nitrogen and heated so as to reach 85° C. During the rise in temperature, to 80° C., 1.63 g of methacrylic acid, 31.71 g of ethylacrylate and 4.96 g of S-propionyl O-ethyl xanthate are introduced. At 85° C., a solution 1.34 g of ammonium persulphate in 2.67 g of water is introduced. Next, a mixture of 285.48 g of ethyl acrylate and 15.03 g of methacrylic acid is added continuously over 1 hour. The system is maintained at 85° C. for an additional 45 minutes, after which a specimen is taken for GPC analysis (gel permeation chromatography and $\overline{M}_n$: number-average molecular mass and $\overline{M}_w$: weight-average molecular mass determination):

$\overline{M}_n$: =12,600 g/mol $\overline{M}_w/\overline{M}_n$=1.97.

While maintaining the reactor at 85° C., the diblock copolymer is synthesized by adding 476 g of vinylacetate over 1 hour 10 minutes, as well as a mixture of 60 g of water, 1.26 g of sodium carbonate and 0.35 g of ammonium persulphate over the same period. Once the introduction has been completed, the reaction is continued for 30 minutes. Next, 1.58 g of t-butyl perbenzoate are added to the reactor. A solution of erythorbic acid in 30 g of water is then added to the reactor, continuously for 1 hour. After the addition has been completed, the reactor is cooled. A specimen is taken for analysis:

$\overline{M}_n$: =27,900 g/mol $\overline{M}_w/\overline{M}_n$=2.47.

EXAMPLE 7

Synthesis of a poly(acrylic acid) b-poly (vinylalcohol) Diblock Copolymer (PAA-b-PVA) by Base Hydrolysis of the PEtA-b-PVAc Copolymer Described in Example 6

The hydrolysis is carried out in the reactor for synthisizing the diblock polymer, on an equivalent of 400 g of dry matter (i.e. 1281 g of latex having a 31.22% solids content). The pH of the latex is adjusted to 8 using a 1M sodium hydroxide solution. The reactor is heated to 60° C. and maintained under a stream of nitrogen. While vigorously stirring, 1077 g of 4M sodium hydroxide are added over 1 hour. The system is maintained at this temperature for 11 hours. The final solids content is 13.6%.

A sample taken at the end of the reaction is analysed by $^1$H NMR. The analysis confirms the disappearance of the peaks characteristic of acrylic esters and of the acetate group.

EXAMPLE 8

Aqueous Colloidal Dispersion of $CeO_2$, Stabilized by a Polyvinyl Acrylate/Polyacrylate Copolymer (PVA-b-PA)

10 g of a 4% by weight dispersion of the PVA-PA copolymer described in Example 7 are poured into a beaker.

The pH of the dispersion is adjusted beforehand to 5.5. While stirring this dispersion, 1.2 cm$^3$ of 0.47 M cerous nitrate solution are added at room temperature over 30 minutes using a microsyringe.

Next, the dispersion is precipitated at pH 8.5 using 1M aqueous ammonia.

It is heated to 80° C. and left overnight.

A colloidal dispersion is obtained.

The X (=PAA monomer/Ce) molar ratio=5

The size of the colloids is approximately 3 nm and is determined by cryogenic transmission electron microscopy (Cryo-TEM).

EXAMPLE 9

Synthesis of a poly(acrylic acid)-b-poly(2-hydroxyethyl acrylate) Diblock Copolymer (PAA-b-PHEA)

1st Part: Synthesis of the PAA First Block 20 g of acrylic acid, 1.39 g of 2 mercaptopropionic acid methyl ester O-ethyl dithiocarbonate (S-propionyl O-ethyl xanthate), 0.164 g of AIBN (azo (bisisobutryonitrile)) and 83 ml of acetone are introduced at room temperature into a 250 ml round-bottom flask fitted with a magnetic stirrer. Next, the flask surmounted by a refrigerant is placed in an oil bath maintained at 70° C. for 18 hours. Next, the solution is concentrated in a rotary evaporator and the polymer is then precipitated in acetonitrile and dried in a vacuum oven.

Aqueous GPC analysis (UV detection at 290 nm) of the polymer obtained confirms the presence of xanthate at the end of the chains, as do $^1$H NMR and MALDI-TOF MS analysis.

Conversion: 93.5%.

$\overline{M}_n$ (number-average molecular mass=2800 g/mol (determined by $^1$H NMR).

2nd Part: Synthesis of the PAA-b-PHEA 8 g of the polyacrylic acid from the first step are introduced into a 250 ml glass round-bottomed flask, together with 0.021 g of AIBN, 52 g of water and 104 g of acetone. Next, the flask surmounted by a refrigerant is placed in an oil bath maintained at 70° C. Next, 40 g of 2-hydroxyethyl acrylate (HEA) are added continuously over 3 hours, as are two portions of 0.021 g of AIBN after 1 hour and 2 hours of reaction. The reaction is continued for 20 hours. Next, the solution is concentrated in a rotary evaporator and the polymer is then precipitated in ether and dried in a vacuum oven.

Yield: 94.6%.

$\overline{M}n$=11,100 g/mol (determined by aqueous GPC, based on polyethylene oxide standards.

EXAMPLE 10

Aqueous Colloidal Dispersion of CeO$_2$, Stabilized by a poly(2-hydroxyethyl acrylate)-b-polyacrylate Copolymer (PHEA-b-PA)

6.8 cc of a 34.6 g/l dispersion of the PAA-bPHEA described in Example 9, adjusted beforehand to pH 5.5, are poured into a beaker. While stirring this dispersion, 6.8 cc of a 0.1 M cerous nitrate solution are added at room temperature, over 30 minutes, using a push syringe.

Next, the mixture is precipitated at pH 8.5 by adding 6 cc of 0.1M aqueous ammonia over approximately 2 minutes. The pH is then stable over time.

It is heated to 80° C. and left overnight.

A colloidal dispersion is obtained.

The X (=PAA monomer/Ce) molar ratio=1 and the Ce concentration is 0.035 M.

Using transmission electron microscopy (TEM), the presence of approximately 20 to 30 nm aggregates consisting of 8 nm elementary particles is observed.

EXAMPLE 11

Aqueous Colloidal Dispersion of La(OH)$_3$·Fe(OH)$_3$

A solution of La nitrate and Fe nitrate is produced as follows:

0.18 ml of a 2.76 mol/l La(NO$_3$)$_3$ solution (i.e. 0.497 mM of La) is introduced into a beaker and diluted with 3 cm$^3$ of demineralized water. The mixture is stirred. Next, 0.2 g of Fe(NO)$_3$)$_3$·xH$_2$O (i.e. 0.5 mM of Fe) is added and the solution made up to 10 cc with demineralized water.

The solution obtained has a L/Fe molar ratio 1 and a 0.1 M (La+Fe) concentration.

The pH of the solution is 2.2.

6.8 cc of a 34.6 g/l dispersion of the PAA-b-PHEA described in Example 9, adjusted beforehand to pH 5.5, is poured into a beaker. While stirring this dispersion, 6.8 cc of the 0.1 M (La+Fe) solution prepared above are added at room temperature, over 30 minutes, using a push syringe.

Next, the mixture is precipitated at pH 8.5 using 1 M aqueous ammonia.

A colloidal dispersion is obtained.

The "PAA monomer/La+Fe" molar ratio=1.

Using TEM, we observe elementary objects having a size of 3 nm, aggregated in a linear form having a length of 50 to 100 nm.

EXAMPLE 12

Aqueous Colloidal Dispersion of Y(OH)$_3$, Stabilized with PHEA-b-PA 13.6 cc of a 34.6 g/l dispersion of the PAA-b-PHEA described in Example 9, adjusted beforehand to pH 5.5, are poured into a beaker. While stirring this dispersion, 13.6 cc of a 0.1 M yttrium nitrate solution are added at room temperature, over 30 minutes, using a push syringe.

Next, the mixture is precipitated at pH 8.5 by adding 14 cc of 0.1 M aqueous ammonia over approximately 14 minutes.

A colloidal dispersion is obtained.

The X(=PAA monomer/Y) molar ratio=1 and the Y concentration=0.33 M.

The mean particle size of the colloids, determined by TEM, is 10 nm.

What is claimed is:

1. A process for preparing mineral particles in the form of colloids in aqueous dispersion of controlled size from a precursor, comprising the steps of:
   a) adding said precursor, which is a mineral salt of a metal cation, into aqueous solution to obtain a product, and then, partially hydrolysing said product;
   b) complexing the product obtained in a) with at least one water-soluble block copolymer having at least one complexing anionic hydrophilic block and at least one stabilizing nonionic hydrophilic block; and
   c) partially or completely hydrolysing said precursor in order to obtain controlled growth of the mineral particles in the form of an aqueous dispersion.

2. A process according to claim 1, wherein the size of the colloid particles obtained at the end of step c) is between 2 and 500 nm.

3. A process according to claim 1, wherein $n_1$ moles of base are added during step a) and $n_2$ moles of base are added during step c), n being the stoichiometric number of moles of base to hydrolyse said precursor and $n_1$, $n_2$ and n being linked by the equation:

$$n_1+n_2=n.$$

4. A process according to claim 3, wherein $n_1$, $n_2$ and n are further linked by the relationships:

0.2n≦$n_1$≦0.8n; and 0.2n≦$n_2$≦0.8n.

5. A process according to claim 3, wherein the base is an alkali or alkaline-earth hydroxide.

6. A process according to claim 5, wherein the base is sodium hydroxide, potassium hydroxide or calcium hydroxide.

7. A process according to claim 1, wherein the complexing copolymer is added in a molar ratio of the complexing group of the anionic hydrophilic block or blocks to the number of moles of the metal cation contained in the mineral precursor, of between 0.05 and 2.

8. A process according to claim 7, wherein the molar ratio of the complexing group to metal cation is between 0.1 and 0.5.

9. A process according to claim 1, wherein, after step c), said process further comprises:

d) a maturation at a temperature of between 50° C. and a temperature of less than or equal to the boiling point of said dispersion.

10. A process according to claim 9, wherein, after step c) or d), said process further comprises:

e) a step of concentrating the dispersion.

11. A process according to claim 10, wherein the concentration step is selected from the group consisting of:

an ultrafiltration step, dialysis step, a drying and redispersion in water step, a precipitation and redispersion in water step, and a centrifuging and redispersion in water step.

12. A process according to claim 1, wherein the metal cation is copper, aluminium, cerium or lanthanum.

* * * * *